United States Patent
Gleu et al.

(10) Patent No.: US 9,399,379 B2
(45) Date of Patent: Jul. 26, 2016

(54) AIR SPRING AND METHOD FOR FOLDING OVER AN AIR SPRING BELLOWS OF AN AIR SPRING

(71) Applicant: Continental Teves AG & Co. oHg, Frankfurt (DE)

(72) Inventors: Jens Uwe Gleu, Langenhagen (DE); Holger Wehaus, Hannover (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/399,375

(22) PCT Filed: Apr. 25, 2013

(86) PCT No.: PCT/EP2013/058615
§ 371 (c)(1),
(2) Date: Nov. 6, 2014

(87) PCT Pub. No.: WO2013/167390
PCT Pub. Date: Nov. 14, 2013

(65) Prior Publication Data
US 2015/0108699 A1   Apr. 23, 2015

(30) Foreign Application Priority Data

May 8, 2012   (DE) .......................... 10 2012 207 606
Mar. 7, 2013   (DE) .......................... 10 2013 203 887

(51) Int. Cl.
*F16F 9/04*   (2006.01)
*B60G 11/27*   (2006.01)
*F16F 9/38*   (2006.01)

(52) U.S. Cl.
CPC .............. *B60G 11/27* (2013.01); *F16F 9/0409* (2013.01); *F16F 9/0454* (2013.01); *F16F 9/38* (2013.01); *Y10T 29/49877* (2015.01)

(58) Field of Classification Search
CPC ......... F16F 9/04; F16F 9/0409; F16F 9/0454; F16F 9/05

USPC .......................... 267/64.23, 64.24, 64.27, 122
See application file for complete search history.

(56) References Cited

U.S. PATENT DOCUMENTS 2,933,308 A   4/1960   McGavern
4,921,226 A   5/1990   Pees (Continued)

FOREIGN PATENT DOCUMENTS

DE   69315379   5/1998
DE   102006036248   2/2008

(Continued)

OTHER PUBLICATIONS

International Search Report for International Application No. PCT/EP2013/058615 mailed Sep. 24, 2013.

(Continued)

*Primary Examiner* — Thomas J Williams
(74) *Attorney, Agent, or Firm* — RatnerPrestia

(57) ABSTRACT

An air spring for chassis of vehicles, which is clamped with an air spring piston and an air spring cover between the chassis and vehicle body of a motor vehicle, includes an elastomeric air spring bellows which at least partially delimits a compressed air-filled working chamber and which, forming at least one rolling fold, rolls on the air spring piston. The air spring bellows is attached by clamping elements to the air spring cover and the air spring piston, including an external guide attached to the air spring bellows and spaced apart from the air spring cover and attached to the air spring bellows such that a partial piece of the air spring bellows is formed between the air spring cover and the external guide as a cardanic fold which permits deflection of the air spring bellows produced by forces acting perpendicular to the axis of the air spring bellows.

17 Claims, 4 Drawing Sheets

(56) References Cited

U.S. PATENT DOCUMENTS

| | | |
|---|---|---|
| 5,253,850 A | 10/1993 | Burkley |
| 6,536,749 B1 | 3/2003 | Luhmann |
| 8,474,798 B2 | 7/2013 | Jeischik |
| 2005/0258579 A1 | 11/2005 | Lloyd |
| 2006/0012089 A1 | 1/2006 | Beck |
| 2006/0273501 A1* | 12/2006 | Taylor ........................ 267/64.27 |
| 2010/0237549 A1* | 9/2010 | Jeischik ........................ 267/122 |
| 2011/0169203 A1* | 7/2011 | Watanabe ...................... 267/122 |
| 2014/0027962 A1* | 1/2014 | Behmenburg et al. ..... 267/64.27 |
| 2016/0075203 A1* | 3/2016 | Schallmeier ........... B60G 11/27 267/64.27 |

FOREIGN PATENT DOCUMENTS

| | | |
|---|---|---|
| DE | 102013203887 | 11/2013 |
| EP | 0262080 | 3/1988 |
| EP | 1144210 | 10/2001 |
| EP | 2330313 | 6/2011 |

OTHER PUBLICATIONS

German Search Report mailed Mar. 20, 2014 in counterpart German Application No. 10 2013 203 887.9

* cited by examiner

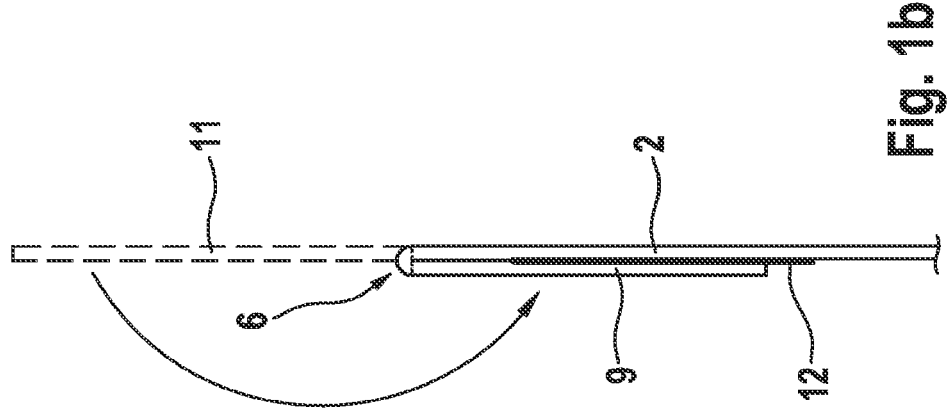
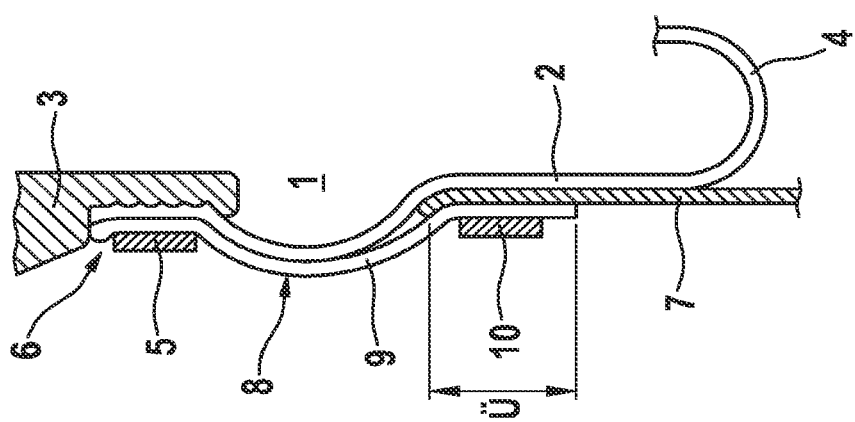

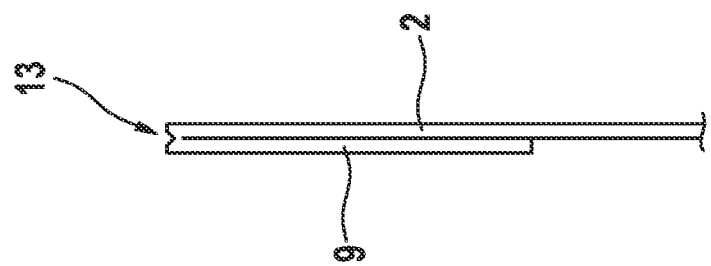
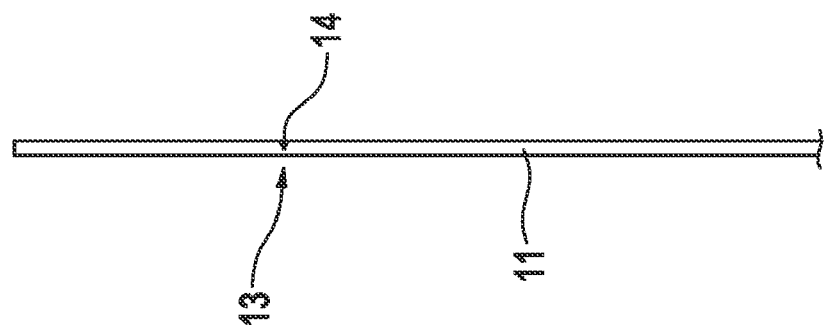
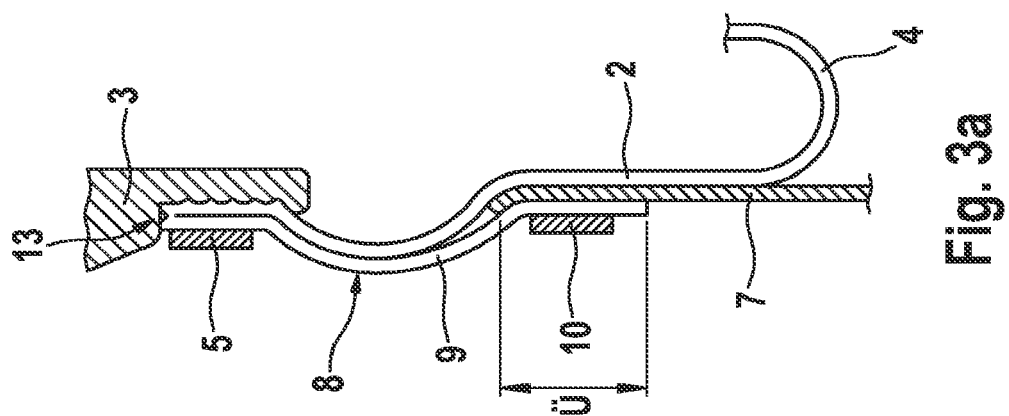

AIR SPRING AND METHOD FOR FOLDING OVER AN AIR SPRING BELLOWS OF AN AIR SPRING

CROSS REFERENCE TO RELATED APPLICATIONS

This application is the U.S. National Phase Application of PCT International Application No. PCT/EP2013/058615, filed Apr. 25, 2013, which claims priority to German Patent Application No. 10 2012 207 606.9, filed May 8, 2012 and German Patent Application No. 10 2013 203 887.9, filed Mar. 7, 2013, the contents of such applications being incorporated by reference herein.

FIELD OF THE INVENTION

The invention relates to an air spring for running gear assemblies of vehicles, which is clamped with an air spring piston and an air spring cover between the running gear assembly and the vehicle body of a motor vehicle, having an air spring bellows made from elastomeric material, which at least partially delimits a compressed air-filled working chamber and which, forming at least one rolling fold, rolls on the air spring piston, wherein the air spring bellows is attached by means of clamping elements at a first end to the air spring cover and at a second end to the air spring piston, having an external guide, which is attached to the air spring bellows and spaced apart from the air spring cover and which is attached to the air spring bellows in such a way that a partial piece of the air spring bellows between the air spring cover and the external guide is formed as a cardanic fold which permits a deflection of the air spring bellows produced by forces acting perpendicular to the axis of the air spring bellows. The invention furthermore relates to a method for folding over an air spring bellows of an air spring.

BACKGROUND OF THE INVENTION

Air spring devices, also referred to as air springs for short, which are clamped between the running gear assembly and the body and have an air spring bellows which, in turn, is secured between the air spring components comprising the air spring cover and the air spring piston, are known in a large number of embodiments. In operation, the air spring is under an internal excess pressure. Under load and during spring movements, the air spring bellows rolls on the outer contour of at least one concentric air spring piston, forming a rolling fold as it does so. An air spring of this kind is often used in road or rail vehicles to achieve comfortable springing.

In this context, there are both air springs in which the air spring bellows forms a rolling fold on only one side, namely generally on the air spring piston, and also air springs in which the air spring bellows is clamped between the air spring cover and the air spring piston, forming a (rolling) fold on both sides. Air springs with a rolling fold on one side can generally be found in passenger vehicles, while the often larger air springs with a rolling fold on both sides, which are capable of bearing heavier loads, tend to be installed in trucks and rail vehicles.

In order to achieve good harshness behavior and comfortable springing behavior, thin air spring bellows are used, these generally being produced as rubber bellows reinforced with fabric. For this purpose, the air springs can furthermore be provided with an external guide which surrounds the air spring bellows as a supporting body.

To attach/clamp the external guide on the air spring bellows, there are essentially two possibilities. On the one hand, clamping of the external guide can be accomplished from the outside on an inner clamping ring. On the other hand, clamping of the external guide is possible by means of an external clamping ring via a supporting element. Clamping the external guide in this way is known from EP 1 144 210 B1, which is incorporated by reference, for example. According to EP 1 144 210 B1, an external support bearing consisting of a textile, elastomeric or thermoplastic material is provided in addition to the air spring bellows, said support bearing being attached to the upper end of the external guide by means of a clamping ring. This support bearing is intended to limit both the axial movement of the external guide and the radial expansion of the air spring bellows in the cardanic fold but at the same time to allow the cardanic movement.

SUMMARY OF THE INVENTION

An aspect of the invention provides an improved and simplified attachment of the external guide to the air spring bellows and a suitable method for folding over the air spring bellows.

According to an aspect of the invention, the air spring bellows has a folded-over ply at the first end, said folded-over ply being folded back over such a length that, after assembly of the air spring, the folded-over ply partially covers the external guide with an overlap, and the external guide is attached to the air spring bellows in the region of the overlap of the folded-over ply by means of an external clamping element. The advantage of this arrangement comes from the absence of an internal clamping ring and hence the possibility of using the full length of the external guide internally as a rolling length for the air spring bellows. Moreover, the folded-over ply limits the radial expansion of the air spring bellows without the need to provide an additional component.

In order to simplify the folding over of the air spring bellows, according to an advantageous embodiment means are provided which enable the air spring bellows to be folded over at a defined point.

According to an advantageous embodiment of the invention, the air spring bellows has a predetermined bending point, at which the folding over takes place. In this case, the predetermined bending point can be provided as an encircling inner groove in the air spring bellows, for example.

The encircling inner groove preferably has a depth of at most half the thickness of the bellows, thereby making it possible to ensure that the folded-over ply remains connected to the air spring bellows.

An alternative embodiment of the invention envisages that a ring is provided in a positioned manner on an outer side of the air spring bellows, and the folding over of the air spring bellows takes place around said ring.

According to an advantageous embodiment of the invention, the folded-over ply is formed in a simple manner before the vulcanization of a bellows blank of the air spring bellows and, to improve strength, the folded-over ply is provided in such a way as to be vulcanized onto the air spring bellows in the region of the air spring cover clamping.

It is advantageous if a separating element is arranged between the air spring bellows and the folded-over ply, in the region of the overlap. It is thereby possible to ensure that the two plies of the spring bellows are vulcanized together only in the region of the air spring cover clamping.

According to an advantageous embodiment of the invention, a separating film made of Teflon is provided as a separating element.

An alternative advantageous embodiment of the invention envisages that the folded-over ply is produced after the vulcanization of a bellows blank of the air spring bellows, thereby eliminating the need for a separating element between the folded-over ply and the air spring bellows.

According to an aspect of the invention, it is envisaged that a folded-over ply at the first end of the air spring bellows is folded back over such a length that, after assembly of the air spring, the folded-over ply partially covers the external guide with an overlap, and the external guide is attached to the air spring bellows in the region of the overlap of the folded-over ply by means of an external clamping element.

BRIEF DESCRIPTION OF THE DRAWINGS

Further features, advantages and possible applications of the invention will emerge from the dependent claims and the following description of illustrative embodiments and with reference to the drawing. In the drawing, which is highly schematized and in section:

FIG. 1a: shows a detail of a first illustrative embodiment of an air spring according to the invention;

FIG. 1b: shows a bent-over air spring bellows of the air spring according to FIG. 1a;

FIG. 2b: shows a vulcanized air spring bellows of the air spring according to FIG. 2a;

FIG. 3a: shows a detail of a third illustrative embodiment of an air spring according to the invention;

FIG. 3b: shows an air spring bellows of the air spring according to FIG. 3a;

FIG. 3c: shows a bent-over air spring bellows of the air spring according to FIGS. 3a and 3b, and FIG. 4: shows a detail of a fourth illustrative embodiment of an air spring according to the invention.

DETAILED DESCRIPTION OF THE PREFERRED EMBODIMENTS

Figure 2C:
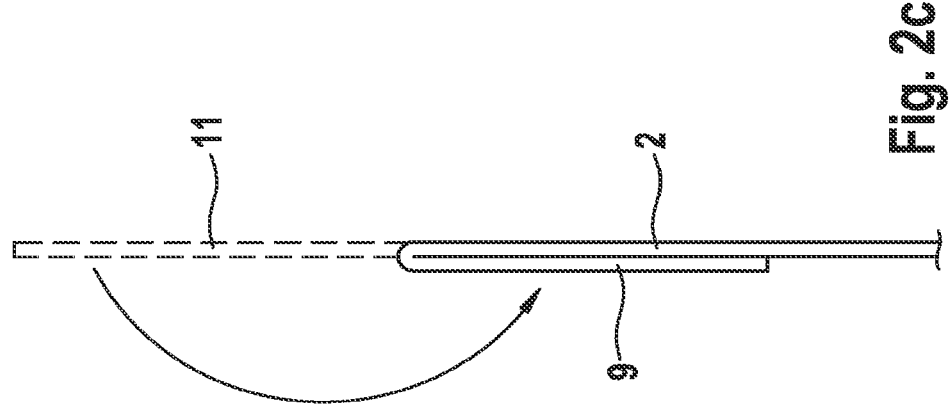
FIG. 2c: shows a bent-over air spring bellows of the air spring according to FIGS. 2a and 2b.

FIG. 1a shows a detail of a first illustrative embodiment of an air spring, which is clamped with an air spring piston (not shown) and an air spring cover 3 between the running gear assembly and the vehicle body of a motor vehicle.

The air spring has an air spring bellows 2 made from elastomeric material, which at least partially delimits a compressed air-filled working chamber 1 and which, forming at least one rolling fold 4, rolls on the air spring piston.

The air spring bellows 2 is attached by means of clamping elements 5 at a first end 6 to the air spring cover 3 and at a second end to the air spring piston.

To improve the harshness behavior and springing behavior, an external guide 7, which is attached to the air spring bellows 2 and spaced apart from the air spring cover 3, is furthermore provided, which is attached to the air spring bellows 2 in such a way that a partial piece of the air spring bellows 2 between the air spring cover 3 and the external guide 7 is formed as a cardanic fold 8. This permits a deflection of the air spring bellows 2 produced by forces acting perpendicular to the axis of the air spring bellows 2.

In order to simplify the attachment of the external guide 7 to the air spring bellows 2, the air spring bellows 2 has a folded-over ply 9 at the first end 6, said folded-over ply being folded back over such a length that, after assembly of the air spring, the folded-over ply 9 partially covers the external guide 7 with an overlap Ü. As FIG. 1a shows, the external guide 7 is attached to the air spring bellows 2 in the region of the overlap Ü of the folded-over ply 9 by means of an external clamping element 10 in the form of a clamping ring. The advantage of this arrangement results from the possibility of using the full length of the external guide internally as a rolling length for the air spring bellows 2. Neither an internal clamping ring nor an external support bearing is required; instead, the folded-over air spring bellows 2 can be used as an axially and radially limiting element.

FIG. 1b shows, in partially dashed representation, the bellows blank 11 of the air spring bellows before the folding over of the folded-over ply 9. As indicated by the arrow, the upper bellows end of the bellows blank 11 is folded over, i.e. bent over, outward in a simple manner before vulcanization and, after vulcanization, is cut to an appropriate length, this being indicated by the dashed line at the end 6 of the bent-over air spring bellows 2.

In order to improve the strength of the air spring bellows 2 in the region of the air spring cover clamping, the folded-over ply 9 is vulcanized to the air spring bellows 3 in this region.

To ensure that the overlap Ü of the folded-over ply 9 can be pulled over the external guide 7, care should be taken during vulcanization to ensure that the plies of the air spring bellows 2 are not vulcanized together, at least in this region. This can be achieved by means of a separating element 12, e.g. in the form of a Teflon film, which is arranged between the air spring bellows 2 and the folded-over ply 9 in the region of the overlap Ü.

Figure 2B:
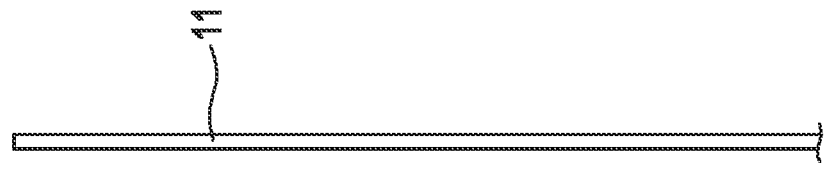
Figure 2A:
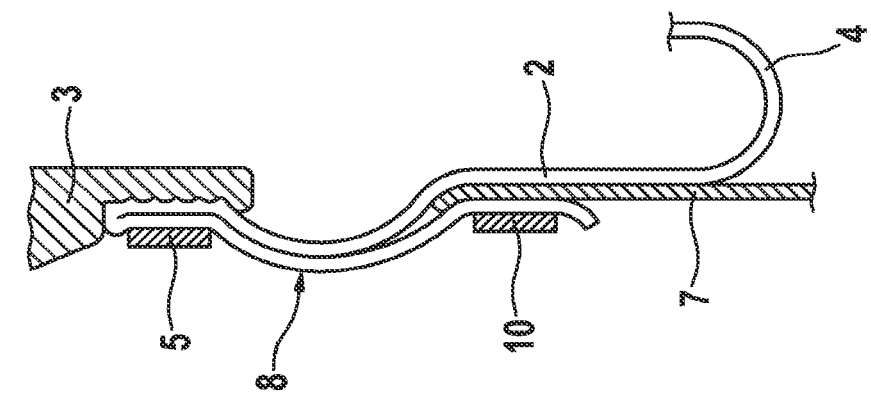
FIG. 2a: shows a detail of a second illustrative embodiment of an air spring according to the invention.

FIGS. 2a, 2b and 2c show a second illustrative embodiment. This alternative embodiment of the invention envisages that the folded-over ply 9 is produced after the vulcanization of the bellows blank 11, thereby eliminating the need for a separating element between the folded-over ply 9 and the air spring bellows 2. Here too, it is advantageous if the external guide 7 is attached as described in relation to the first illustrative embodiment.

Figure 4:
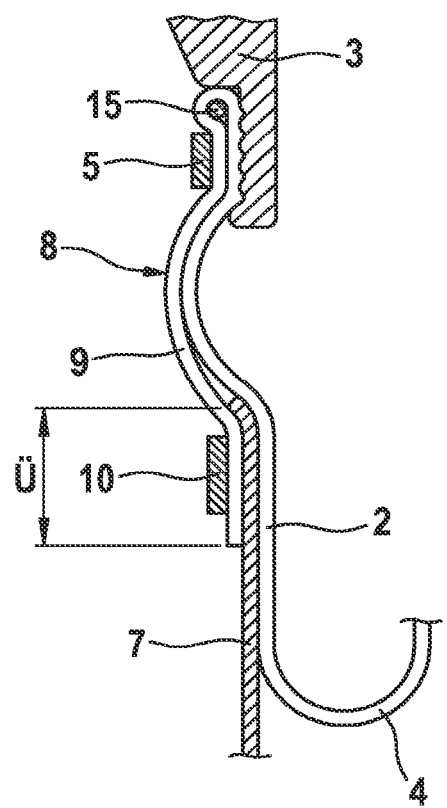

In order to simplify the process of folding over the air spring bellows 2, the following methods for folding over can be carried out, these being described with reference to the illustrative embodiments according to FIGS. 3a to 4. Both methods can be employed with the embodiments described above.

FIG. 3a shows a detail of a third illustrative embodiment of an air spring. In contrast to the first two embodiments, means are provided here which enable the air spring bellows 2 to be folded over at a defined point.

More specifically, the means are provided as a predetermined bending point 13, at which the folding over of the air spring bellows 2 takes place. As can be seen particularly from FIG. 3b, which shows the bellows blank 11 before it has been folded over, the predetermined bending point 13 can, for example, be provided as an encircling inner groove 14 in the air spring bellows, which has a depth of at most half the thickness of the bellows in order to ensure that the folded-over ply 9 remains connected to the air spring bellows 2.

According to a fourth illustrative embodiment, the folding over of the air spring bellows 2 takes place around a ring 15, which is positioned on an outer side of the air spring bellows 2 and thus likewise allows the air spring bellows 2 to be folded over in a simple manner at a defined point.

LIST OF REFERENCE SIGNS 1 working chamber
2 air spring bellows
3 air spring cover 4 rolling fold
5 clamping element
6 end
7 external guide
8 cardanic fold
9 folded-over ply
10 clamping element
11 bellows blank
12 separating element
13 predetermined bending point
14 inner groove
15 ring

The invention claimed is:

1. An air spring for running gear assemblies of vehicles, which is clamped with an air spring piston and an air spring cover between the running gear assembly and a vehicle body of a motor vehicle, comprising:
an air spring bellows made from elastomeric material, which at least partially delimits a compressed air-filled working chamber and which, forming at least one rolling fold, rolls on the air spring piston, wherein the air spring bellows is attached by clamping elements at a first end to the air spring cover and at a second end to the air spring piston, and
an external guide, which is attached to the air spring bellows and spaced apart from the air spring cover and which is attached to the air spring bellows in such a way that a partial piece of the air spring bellows between the air spring cover and the external guide is formed as a cardanic fold which permits a deflection of the air spring bellows produced by forces acting perpendicular to the axis of the air spring bellows, wherein the air spring bellows has a folded-over ply at the first end, said folded-over ply being folded back over such a length that, after assembly of the air spring, the folded-over ply partially covers the external guide with an overlap,
wherein the external guide is attached to the air spring bellows in the region of the overlap of the folded-over ply by an external clamping element such that, at a portion of the external guide that overlaps with the external clamping element in a radial direction of the air spring bellows, an outer surface of the external guide contacts the folded-over ply and an inner surface of the external guide contacts the air spring bellows.

2. The air spring as claimed in claim 1, further comprising means which enable the air spring bellows to be folded over at a defined point.

3. The air spring as claimed in claim 2, wherein the air spring bellows has a predetermined bending point, at which the folding over takes place.

4. The air spring as claimed in claim 3, wherein the predetermined bending point is provided as an encircling inner groove in the air spring bellows.

5. The air spring as claimed in claim 4, wherein the encircling inner groove has a depth of at most half the thickness of the bellows.

6. The air spring as claimed in claim 2, wherein a ring is provided in a positioned manner on an outer side of the air spring bellows, and the folding over of the air spring bellows takes place around said ring.

7. The air spring as claimed in claim 1, wherein the folded-over ply is formed before a vulcanization of a bellows blank of the air spring bellows and the folded-over ply is provided in such a way as to be vulcanized onto the air spring bellows in the region of the air spring cover clamping.

8. The air spring as claimed in claim 7, further comprising a separating element arranged between the air spring bellows and the folded-over ply, in the region of the overlap.

9. The air spring as claimed in claim 8, wherein a separating film made of Teflon is provided as the separating element.

10. The air spring as claimed in claim 1, wherein the folded-over ply is produced after a vulcanization of a bellows blank of the air spring bellows.

11. A method for folding over an air spring bellows of an air spring for running gear assemblies of vehicles, wherein the air spring bellows is attached by clamping elements at a first end to an air spring cover and at a second end to the air spring piston, and an external guide, which is spaced apart from the air spring cover and which is attached to the air spring bellows in such a way that a partial piece of the air spring bellows between the air spring cover and the external guide is formed as a cardanic fold which permits a deflection of the air spring bellows produced by forces acting perpendicular to the axis of the air spring bellows, comprising:
a folded-over ply at the first end of the air spring bellows is folded back over such a length that, after assembly of the air spring, the folded-over ply partially covers the external guide with an overlap, and the external guide is attached to the air spring bellows in the region of the overlap of the folded-over ply by an external clamping element such that, at a portion of the external guide that overlaps with the external clamping element in a radial direction of the air spring bellows, an outer surface of the external guide contacts the folded-over ply and an inner surface of the external guide contacts the air spring bellows.

12. The method for folding over an air spring bellows as claimed in claim 11, wherein the folding over of the air spring bellows takes place at a defined point.

13. The method for folding over an air spring bellows as claimed in claim 12, wherein a ring, around which the folding over of the air spring bellows takes place, is positioned on an outer side of the air spring bellows.

14. The method for folding over an air spring bellows as claimed in claim 11, wherein the folded-over ply is formed before a vulcanization of a bellows blank of the air spring bellows and the folded-over ply is vulcanized onto the air spring bellows in the region of the clamping of the air spring cover, wherein a separating element is arranged between the air spring bellows and the folded-over ply, in the region of the overlap.

15. The method for folding over an air spring bellows as claimed in claim 11, wherein the folded-over ply is produced after a vulcanization of a bellows blank of the air spring bellows.

16. A method for folding over an air spring bellows of an air spring for running gear assemblies of vehicles, wherein the air spring bellows is attached by clamping elements at a first end to an air spring cover and at a second end to the air spring piston, and an external guide, which is spaced apart from the air spring cover and which is attached to the air spring bellows in such a way that a partial piece of the air spring bellows between the air spring cover and the external guide is formed as a cardanic fold which permits a deflection of the air spring bellows produced by forces acting perpendicular to the axis of the air spring bellows, comprising:
a folded-over ply at the first end of the air spring bellows is folded back over such a length that, after assembly of the air spring, the folded-over ply partially covers the external guide with an overlap, and the external guide is attached to the air spring bellows in the region of the overlap of the folded-over ply by an external clamping element, wherein the folding over of the air spring bellows takes place at a defined point which is a predetermined bending point.

17. The method for folding over an air spring bellows as claimed in claim 16, wherein an encircling inner groove is introduced into the air spring bellows as the predetermined bending point.

* * * * *